United States Patent Office 3,163,576
Patented Dec. 29, 1964

3,163,576
SUPPOSITORY BASE COMPRISING GLYCERIN AND A DIESTER OF POLYETHYLENE GLYCOL
Ruth N. Havemeyer, New Brunswick, N.J., assignor to Olin Mathieson Chemical Corporation, New York, N.Y., a corporation of Virginia
No Drawing. Filed June 12, 1961, Ser. No. 116,272
8 Claims. (Cl. 167—64)

This invention relates to new pharmaceutical compositions and more particularly to new suppository formulations.

The suppository is a well known form for administering medicaments. Unfortunately, however, in many instances it has been found that known suppository formulations were unsuitable for use as a vehicle with certain medicaments since such medicaments were unstable therein. Thus, for example it has been found that when a suppository base of some polyethylene glycols or monoester derivatives thereof, such as polyethylene glycol 4000 monostearate, is admixed with a medicament, such as piperestazine, the medicament is unstable so that therapeutic activity is gradually lost.

It is an object of this invention, therefore, to provide a suppository base in which relatively unstable medicaments may be formulated.

It is a further object of this invention to provide a suppository containing an otherwise unstable medicament in stable formulation.

These objects are achieved by the composition of this invention which include: (a) a suppository base comprising glycerin and a diester of polyethylene glycol, and (b) a suppository comprising a medicament, glycerin and a diester of polyethylene glycol.

Among the suitable diesters of polyethylene glycol are those which melt at a range of about 52° C. to about 58° C. Such diesters include the diesters of polyethylene glycols of a molecular weight of about 4000 to about 6000. Suitable esters include those derived from higher alkanoic acids, particularly alkanoic acids of from 12 to 18 carbon atoms, as exemplified by stearic acid and lauric acid; and higher alkenoic acids, particularly alkenoic acids of from 12 to 18 carbon atoms, as exemplified by oleic acid. Particularly preferred are the esters with higher alkanoic acids.

The suppository bases of this invention preferably contain about 5% to about 7% glycerin, optimally about 5.5% to about 6% glycerin, based on the total weight of glycerin and diester of polyethylene glycol. The base can readily be prepared by heating the diester and the glycerin to a temperature not above 60° C., mixing the two components and cooling to room temperature.

To prepare the medicated suppositories of this invention, a medicament is added to the suppository base before it has cooled and solidified, or after it has been formed, by reheating prior to admixing the medicament. Although any medicament may be used, the suppository base of this invention finds particular applicability when a medicament unstable in known suppository bases is incorporated therein. Such medicaments include fluphenazine dihydrochloride and piperestazine. The concentration of the medicament in the suppository is of course dependent upon the relative activity of the particular medicament. The concentration should be such as to provide a therapeutically utilizable dose of medicament.

In addition to the medicament, other ingredients, such as dyes and opacifiers, may also be included in either the suppository bases or the final suppository compositions of this invention. Illustrative of such dyes are F.D.C. Red #2, D.C. Yellow #11 and D.C. Red #15; whereas titanium dioxide and zinc oxide may be mentioned as suitable opacifiers. The suppository base of this invention serves an additional advantageous purpose in that certain of said dyes are unstable in known suppository base formulations.

The following examples illustrate the preparation of the compositions of this invention (all temperatures being in centigrade).

EXAMPLE 1

Suppository Base 94 g. of polyethylene 4000 distearate is melted on a steam bath and then cooled to 58–60°. 6 g. of glycerin is warmed to 58–60° and then added to the polyethylene glycol distearate. The mixture is heated at 58–60° for one hour and then cast in suppository molds and allowed to solidify.

EXAMPLE 2

Suppository 5.5 g. of glycerin is warmed to 58–60° and 0.81 g. of piperestazine is dissolved therein. 0.5 g. of titanium dioxide is dispersed in the warm glycerin solution. The resulting mixture is then added to 93.2 g. of previously melted polyethylene glycol 4000 distearate and the resultant mass is heated at 58–60° for one hour. It is then cast into suppository molds and allowed to solidify.

EXAMPLE 3

Suppository 6.0 g. of glycerin is warmed to 58–60° and 0.04 g. of fluphenazine dihydrochloride is dissolved therein. 13.05 gamma of D.C. Yellow #11 is dispersed in the warm glycerin solution. The resulting mixture is then added to 94 g. of polyethylene glycol 4000 dilaurate, previously melted on a steam bath and cooled to 60°. The resulting mass is heated for one hour at 58–60° and then cast into molds and allowed to solidify.

This invention may be variously otherwise embodied within the scope of the appended claims.

What is claimed is:

1. A suppository base which consists of from about 5 to about 7% of glycerin and a diester of polyethylene glycol of a molecular weight of about 4100 to about 6000, wherein the diester is derived from the group consisting of higher alkanoic acids and higher alkenoic acids of from 12 to 18 carbon atoms.

2. The suppository base of claim 1, wherein the diester of polyethylene glycol melts at a range of about 52° C. to about 58° C.

3. The suppository base of claim 1, wherein the diester of polyethylene glycol is polyethylene glycol distearate.

4. The suppository base of claim 1, wherein the diester of polyethylene glycol is polyethylene glycol 4000 distearate.

5. A suppository which comprises a therapeutically utilizable dose of a medicament selected from the group consisting of fluphenazine dihydrochloride and piperestazine; from about 5 to about 7% of glycerin and a diester of polyethylene glycol of a molecular weight of from 4000 to about 6000, wherein the diester is derived from the group consisting of higher alkanoic acids and higher alkenoic acids of from 12 to 18 carbon atoms.

6. The suppository of claim 5, wherein the diester of polyethylene glycol is polyethylene glycol 4000 distearate.

7. A suppository which comprises of from about 5 to about 7% of glycerin, a diester of polyethylene glycol of a molecular weight of about 4000 to about 6000, wherein the diester is derived from the group consisting of higher alkanoic acids and higher alkenoic acids of from 12 to 18 carbon atoms, and a therapeutically utilizable dose of fluphenazine dihydrochloride as a medicament.

8. A suppository which comprises from about 5 to about 7% of glycerin, a diester of polyethylene glycol of a molecular weight of about 4000 to about 6000, wherein the diester is derived from the group consisting of higher alkanoic acids and higher alkenoic acids of from 12 to 18 carbon atoms, and a therapeutically, utilizable dose of piperestazine as a medicament.

References Cited in the file of this patent

UNITED STATES PATENTS

| | | |
|---|---|---|
| 2,149,005 | Bockmuhl et al. | Feb. 28, 1939 |
| 2,623,839 | Taub | Dec. 30, 1952 |
| 2,713,019 | Jeffries | July 12, 1955 |

OTHER REFERENCES

Lehmann: Pharmaceutica Acta Helvetiae, vol. 21, pages 358–360, December 28, 1946.

Manz et al.: Suddeutsche Apotheker-Zeitung, No. 17, pages 321–322, April 28, 1950.

Gross et al.: Journal of the American Pharmaceutical Assoc., Sci. Ed., vol. 42, No. 2, page 93, February 1953.

Carbowax Bulletin, published by Union Carbide Chemicals Co., New York, 1958, pages 13–15.